H. A. Parkhurst. Sheet 1, 2 Sheets.

Mower.

No. 3,447. Reissued May 18, 1869.

Witnesses.

Joe L. Peyton

Battis De Long.

Inventor.

C. H. McCormick by his Atty

Wm. D. Baldwin

N. PETERS, PHOTO-LITHOGRAPHER, WASHINGTON, D. C.

H. A. Parkhurst. Sheet 2, 2 Sheets.

Mower.

No. 3,447. Reissued May 18, 1869.

Witnesses.

Joe Peyton.

Baltis De Long.

Inventor.

C. H. McCormick by his Atty

Wm. D. Baldwin

N. PETERS, PHOTO-LITHOGRAPHER, WASHINGTON, D. C.

UNITED STATES PATENT OFFICE.

C. H. McCORMICK, OF CHICAGO, ILLINOIS, ASSIGNEE, BY MESNE ASSIGNMENTS, OF HAMILTON A. PARKHURST.

IMPROVEMENT IN HARVESTERS.

Specification forming part of Letters Patent No. 19,442, dated February 23, 1858; Reissue No. 3,447, dated May 18, 1869.

*To all whom it may concern:*

Be it known that HAMILTON A. PARKHURST, of Fairfield, in the county of Herkimer and State of New York, invented certain new and useful Improvements in Harvesting-Machines, of which the following is a full, clear, and exact description.

The invention herein claimed relates to that class of two-wheeled harvesters in which a laterally-projecting cutting apparatus is suspended by one end only from a main frame by hinged connections, which permit the finger-beam to rise and fall to conform to the undulations of the surface over which it slides.

The object of the first part of the invention is to allow the cutting apparatus to rise and fall without interfering with the operation of the cutters; and the improvement consists in a novel method of connecting a laterally-projecting finger-beam with the main frame by means of an intermediate coupling-frame hinged both in front and in rear of the wheels on a line, or nearly so, with the crank-shaft.

The object of the next part of the invention is to secure a firm support for a finger-beam hinged to the main frame, and to allow the finger-beam to be placed, if required, partially within the periphery of the driving-wheels; and the improvement consists in a novel method of connecting a short finger-beam with a main frame by a coupling-frame encompassing the inner wheel and hinged to the main frame above the plane of the cutters.

Figure 1:
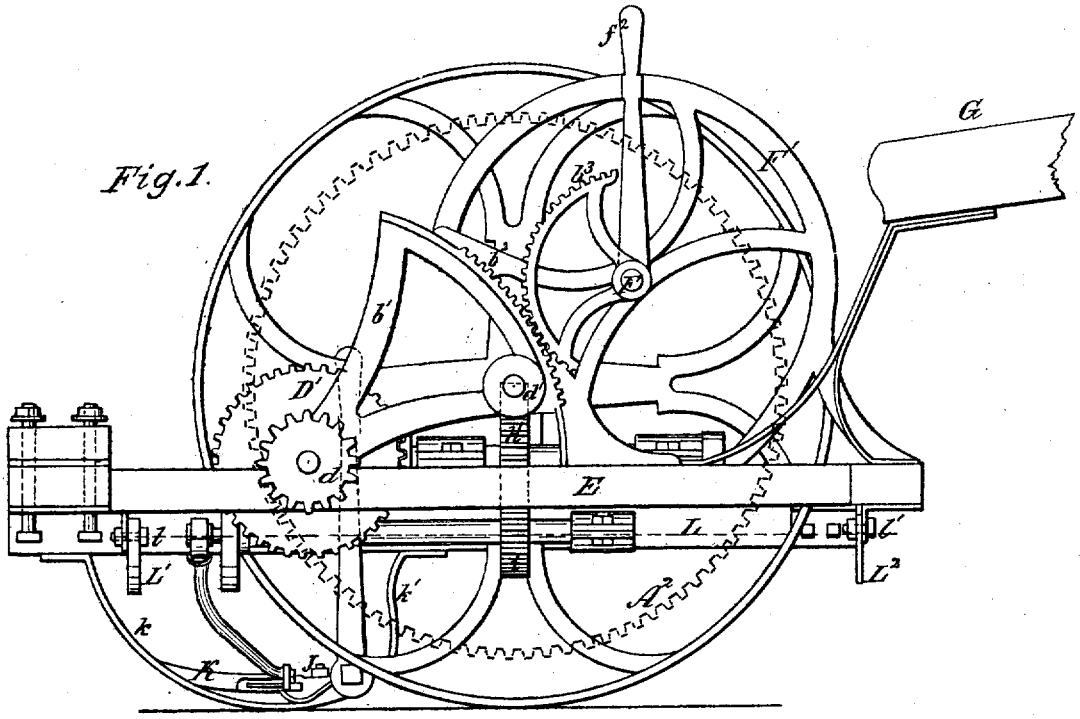
Figure 2:
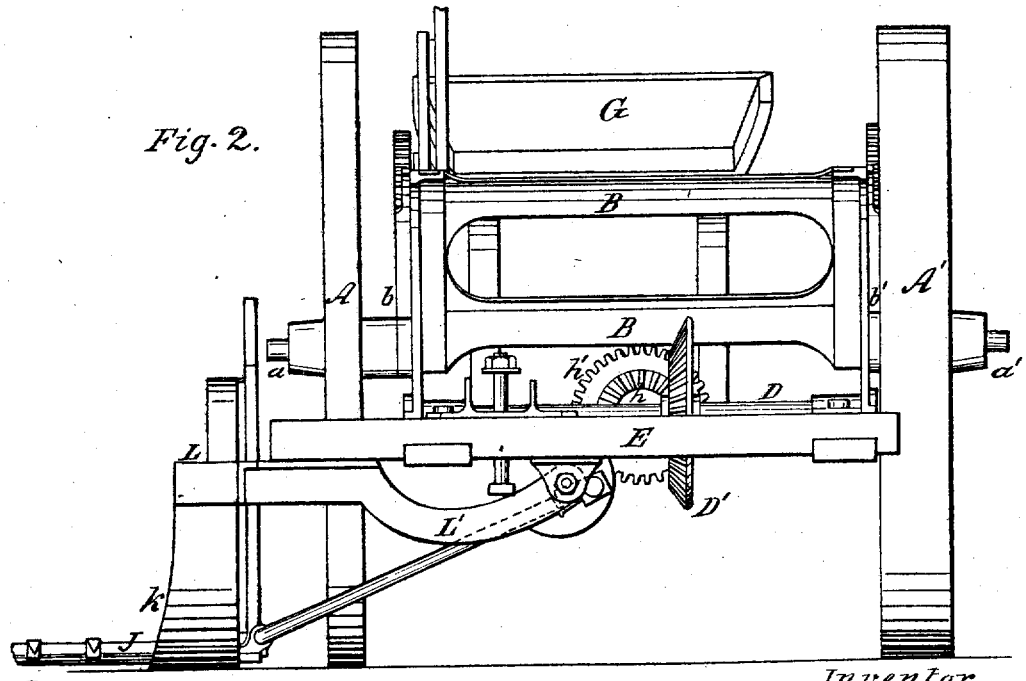
Figure 3:
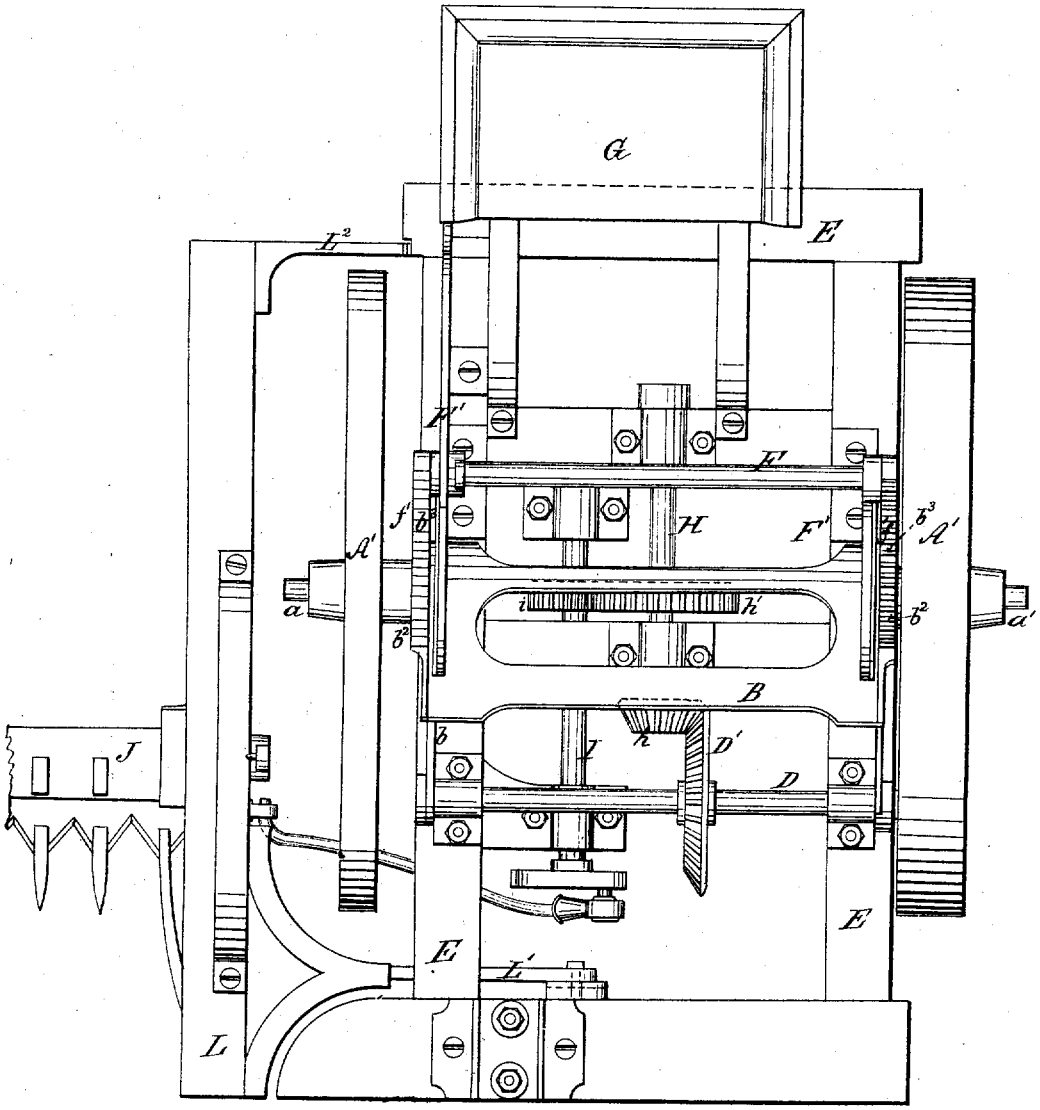

In the accompanying drawings, which show all of said PARKHURST'S improvements as embodied in one machine, Figure 1 represents a view in elevation of the improved harvester as seen from the stubble side thereof, with the outer wheel removed. Fig. 2 represents a similar view of the same as seen from the front, with both wheels in place; and Fig. 3 represents a plan or top view of the same.

Two main bearing-wheels, A A′, turn freely on stud-axles *a a′*, mounted on radius-bars or sector-plates *b b′*, connected by a frame, B, spanning the main frame and oscillating around a shaft, D, turning in suitable bearings on the main frame E. Teeth $b^2$ on the sectors *b b′* gear into corresponding teeth, $b^3$, on quadrant-racks *f f′*, fixed upon and turning with a rock-shaft, F, mounted on a frame, F′, and controlled by a hand-lever, $f^2$, operated by the driver from his seat G. The lever is held in any desired position by pins in the frame F′ on the rear of the main frame. The front side of the frame F′ is concave, and fits the curved surface of the frame B, on which it slides, thus always affording a firm support.

By this mode of construction, it will be observed, the main frame can be raised or lowered relatively to the axles *a*. In order that the raising and lowering of this frame may not impede the working of the gearing, the axis around which the radius-bars move on the main frame as it is adjusted is made coincident with the center of rotation of the shaft which drives the gearing. In this instance, in order to diminish the side draft, the outer wheel, A′, only drives. An internally-geared spur-wheel, $A^2$, (shown in red in Fig. 1,) on this wheel drives a corresponding pinion, *d*, on the counter-shaft D, on which the sectors *b b′* are pivoted. A bevel-wheel, D′, on this shaft drives a corresponding pinion, *h*, on a secondary shaft, H, crossing the line of the axles of the main wheels, and carrying a spur-wheel, *h′*, driving a corresponding pinion, *i*, on a crank-shaft, I, parallel to the shaft H, and crossing both the main axles and counter-shaft, but at a lower level, to bring the crank closer to the ground. The cutters are driven by a crank and pitman in the usual way.

It will be observed that the machine is triple-geared instead of double-geared, and an increased speed is thus given to the cutters without increasing the speed of the horses.

A finger-beam, J, is secured to a shoe, K, connected by front and rear arms, *k k′*, with a beam, L, parallel with the face of the inner wheel. Arms $L'$ $L^2$, secured to this beam in front and rear, are pivoted to the main frame by joints *l l′* in line, or nearly in line, with the crank-shaft, as shown by the red lines in Fig. 1, by which means the cutting apparatus can play up and down without disturbing the relations of the guards and cutters. The finger-beam is made short—that is, no longer than the cutters—while the arms $L'$ $L^2$ are connected with the beam L and pivoted to the frame high above the cutters, so as to clear the cut crop; and as no portion of the main frame extends below the coupling-arms, the cutting apparatus can descend into hollows, and thus cut closely over uneven ground.

What is claimed herein as the invention of said PARKAURST is—

1. The combination, in a two-wheeled harvester, of a main frame and a laterally-projecting cutting apparatus with a coupling-frame hinged both in front and rear of the wheels in line with the crank-shaft, substantially as set forth.

2. The combination, in a two-wheeled harvester, of a main frame and a laterally-projecting short finger-beam with a coupling-frame encompassing the inner wheel and hinged to the main frame above the plane of the cutters, substantially as set forth.

C. H. McCORMICK.

Witnesses:
T. B. WAKEMAN,
J. B. ROE.